(12) United States Patent
Wang et al.

(10) Patent No.: US 6,490,605 B2
(45) Date of Patent: *Dec. 3, 2002

(54) TYPE OF EASY-TO-USE ELECTRONIC CALCULATOR

(75) Inventors: Guihua Wang, No. 20 Sanhuanglu, Guilin City, Guangxi, 541001 (CN); Tao Wang, Guilin (CN); Lei Wang, Guilin (CN); Ying Chen, Guilin (CN)

(73) Assignee: Guihua Wang, Guangxi (CN)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,749

(22) PCT Filed: Feb. 26, 1997

(86) PCT No.: PCT/CN97/00012

§ 371 (c)(1), (2), (4) Date: Mar. 23, 1999

(87) PCT Pub. No.: WO97/32260

PCT Pub. Date: Sep. 4, 1997

(65) Prior Publication Data

US 2002/0078108 A1 Jun. 20, 2002

(30) Foreign Application Priority Data

Feb. 26, 1996 (CN) .......................................... 96103035

(51) Int. Cl.$^7$ ................................................. G06F 3/00
(52) U.S. Cl. .................................................... 708/164
(58) Field of Search ................................. 708/130, 131, 708/142, 145, 160, 164

(56) References Cited

U.S. PATENT DOCUMENTS

| | | | | |
|---|---|---|---|---|
| 4,120,036 A | * | 10/1978 | Maeda et al. ................ | 708/111 |
| 4,228,516 A | | 10/1980 | Johnston, Sr. ............... | 364/602 |
| 4,722,065 A | * | 1/1988 | Ogawa ......................... | 708/140 |
| 4,800,514 A | * | 1/1989 | Earle ............................ | 708/208 |
| D309,749 S | * | 8/1990 | Ido ............................... | D18/7 |

* cited by examiner

Primary Examiner—Chuong Dinh Ngo
(74) Attorney, Agent, or Firm—Ladas & Parry

(57) ABSTRACT

The invention relates to "a type of easy-to-use electronic calculator", which electronic calculator is characterized in that in addition to the calculation functions of conventional electronic calculators, it is especially convenient in the input of data and instruction. It is a common panel configuration that the display screen is on top of conventional electronic calculators and the input keyboard is on the bottom, which is not so easy to use. According to the invention, buttons are arranged on the upper and right side of the display screen to facilitate the input, enabling the frequently input buttons and display screen to be within the visible scope making the calculator easier to use.

2 Claims, 4 Drawing Sheets

TYPE OF EASY-TO-USE ELECTRONIC CALCULATOR

FIELD OF INVENTION

The present invention relates to an improved electronic calculator characterized in that besides the calculation functions of conventional electronic calculators, it is very convenient for input of data and instructions, definitely greatly increasing the efficiency of the electronic calculator and making the application of electronic calculator more widespread and convenient.

BACKGROUND OF INVENTION

The existing electronic calculators typically have an arrangement of a front panel with a data display screen on the top of the input keys. The drawbacks of such arrangement reside in that the data display screen is spaced from the keys for a certain distance, additionally, the keys are positioned below the display screen, making the full utilization of human vision in unfavorable situation. In such situation when one is using the electronic calculator, whenever a number or operation instruction is being input, he has to move his visual line from the display screen to the key to be pressed. When one has finished the action of pressing a key, he has to move his visual line again from the position of the key to the display screen to view the result of the operation for determining the correctness of his operation. Thus, each time for one to perform an operation, he has to move his visual line up and down twice. In practice, there will be large amount of data required to be computed and processed, especially for technical and financial personnel, the input amount of data and operation instructions is undoubtedly large. And the number of up and down movements of the human visual line is twice that of the inputs. Such frequent up and down movements of the human visual line very likely cause one's eyes to be tired, even resulting in dizziness, this makes financial personnel subject to error making. On the other hand, it severely limits the speed of the use of the electronic calculators, reducing the efficiency of the use of the electronic calculators. It is well known that electronic calculators have the advantages of high operation speed and calculation accuracy. But many people have already felt that the functions of the electronic calculators are limited due to the inconvenience of their input. which in turn limits the use of electronic calculators severely. Due to the above mentioned reasons, most of the financial personnels are still using the old calculation tool, i.e., abacus, to perform calculation, and rarely using such advanced calculation tool as electronic calculator, this is a backward phenomenon fallen behind the development of science. In fact, a lot of people have endeavored to solve the hard problem of difficulty of the input of electronic calculators. Some of them have tried to do so by increasing the size of the keys, some of them by decreasing the number of keys, and yet some of them by reducing the functions of the electronic calculator. However, all those ways are less effective, without substantial effect. In fact, this problem has not been solved up-to-date.

SUMMARY OF INVENTION

It is therefore an object of the present invention to provide a new type of easy-to-use electronic calculator which can conveniently solve the problem of difficulty of data and operation instructions input of electronic calculator. This will provide an ideal and popular "new type of easy-to-use electronic calculator".

The present invention is based on the long-time thorough observation and investigation of the characteristics of Herman vision, which reveals that human vision has the following characteristics, i.e., the residuary light area above the human visual line is greater than the residuary light area below the visual line. In accordance with this characteristic, the input keys of the electronic calculator originally positioned below the display screen are moved to the upper, upper right and right sides adjacent to the display screen, some of the infrequently used keys may still be arranged at positions easy-to-operate immediately below the display screen, as shown in FIGS. 1, 2, and 3. Thus, one only needs to always keep his visual line on the display screen while performing calculation operation, but with the residuary sight of his eyes to monitor the input by pressing keys. This allows the convenient input by pressing keys without the multiple to-and-fro movements of the human visual line, of course, this may reduce the burden of human eyes, as well as in crease the speed and efficiency of the use of the electronic calculator and improve the accuracy of operation.

It is discovered by observation that a number is input into the electronic calculator at the last digit. From this feature, one has only to watch and determine whether the last digit of an input number on the display screen is correct to determine the correctness of each operation. Thus, when one is performing calculation operation on the electronic calculator, he has only to concentrate his attention on the last digit of the display screen. Thereby, the last digit on the display screen may be orderly arranged with the ten frequently used numeric keys 0 through 9, that is, the last digit on the display screen is arranged in an area of suitable size, concentratively with the ten numeric input keys, this area may be simultaneously within a visual field without or with little movement of the human visual line. The input keys of an electronic calculator can be appropriately arranged in partitioned areas according to their functions, and high light this small area with suitable indicative pattern, making it more eye-catching.

In the various arrangement schemes mentioned above; the last numeric digit on the display screen can be enlarged, for example, to occupy the position of two digits. This arrangement will make the last digit more eye-catching, and the input performance more convenient.

BRIEF DESCRIPTION OF THE DRAWINGS

The present invention will be described in detail with reference to the accompanying drawings, wherein.

PREFERRED EMBODIMENTS

Embodiment Scheme 1

Figure 1:
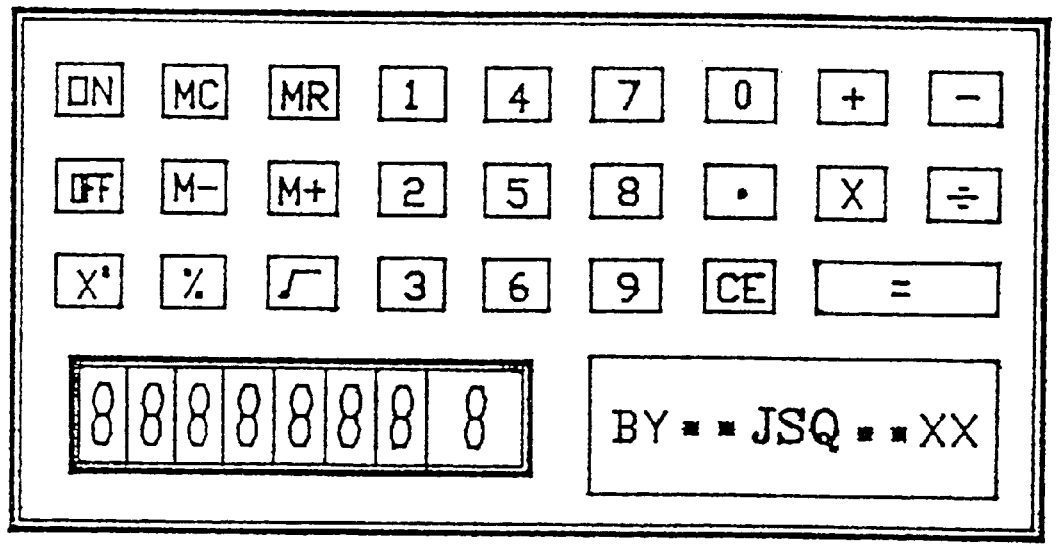
FIG. 1 is a schematic diagram of a first scheme embodying the electronic calculator of the present invention.

The first scheme embodying the present inanition as shown in FIG. 1 arranges the infrequently used keys of the electronic calculator in the upper positions closely adjacent to the display screen, and arranges the ten frequently used data input keys 0 through 9 in positions adjacent to the upper and upper right sides of the last digit of the display screen.

Embodiment Scheme 2

Figure 2:
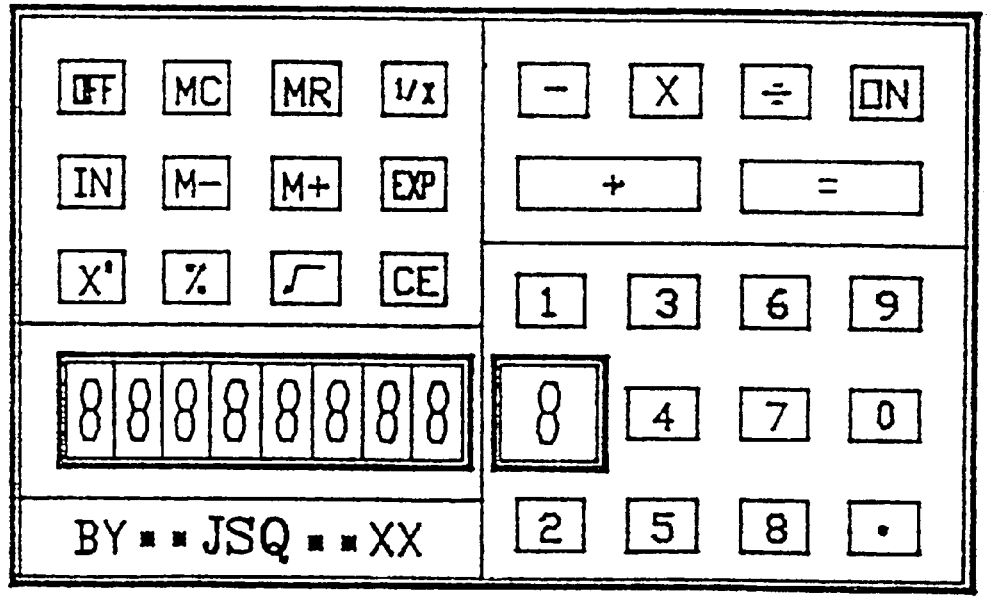
FIG. 2 is a schematic diagram of a second scheme embodying the electronic calculator of the present invention.

The second scheme embodying the present invention as shown in FIG. 2 still arranges the infrequently used keys in positions adjacent to the upper side of the display screen, but orderly arranges the ten frequently used data input keys 0 through 9 in a small area with the last digit of the display screen, and arranges the keys on the calculator panel in partitioned areas according to their different functions.

Embodiment Scheme 3

Figure 3:
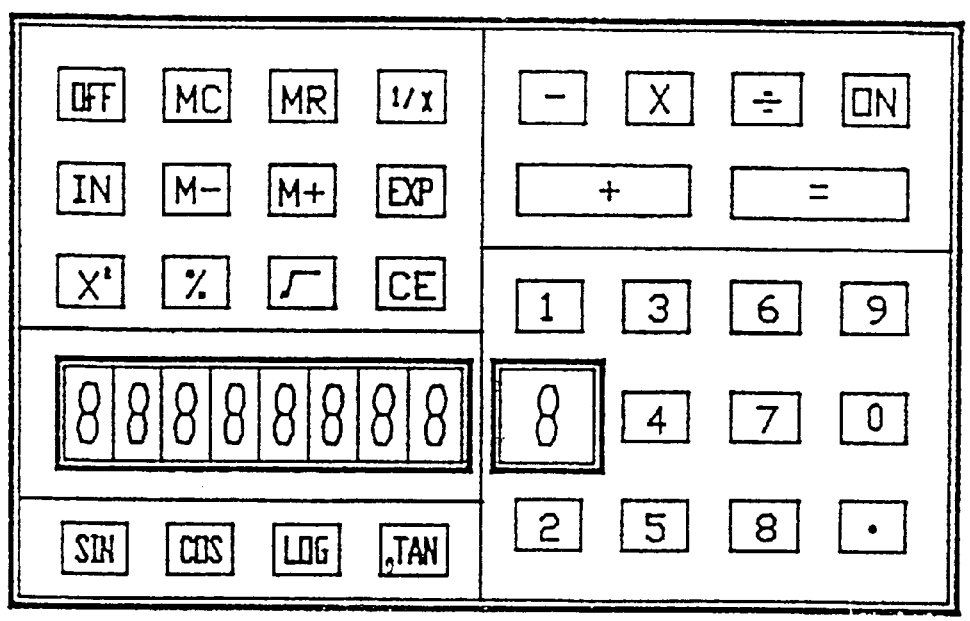
FIG. 3 is a schematic diagram of a third scheme embodying the electronic calculator of the present invention.

The third scheme embodying the present invention as shown in FIG. 3 arranges a portion of several infrequently used keys in positions below the display screen, based on the first and second schemes.

Figure 4:
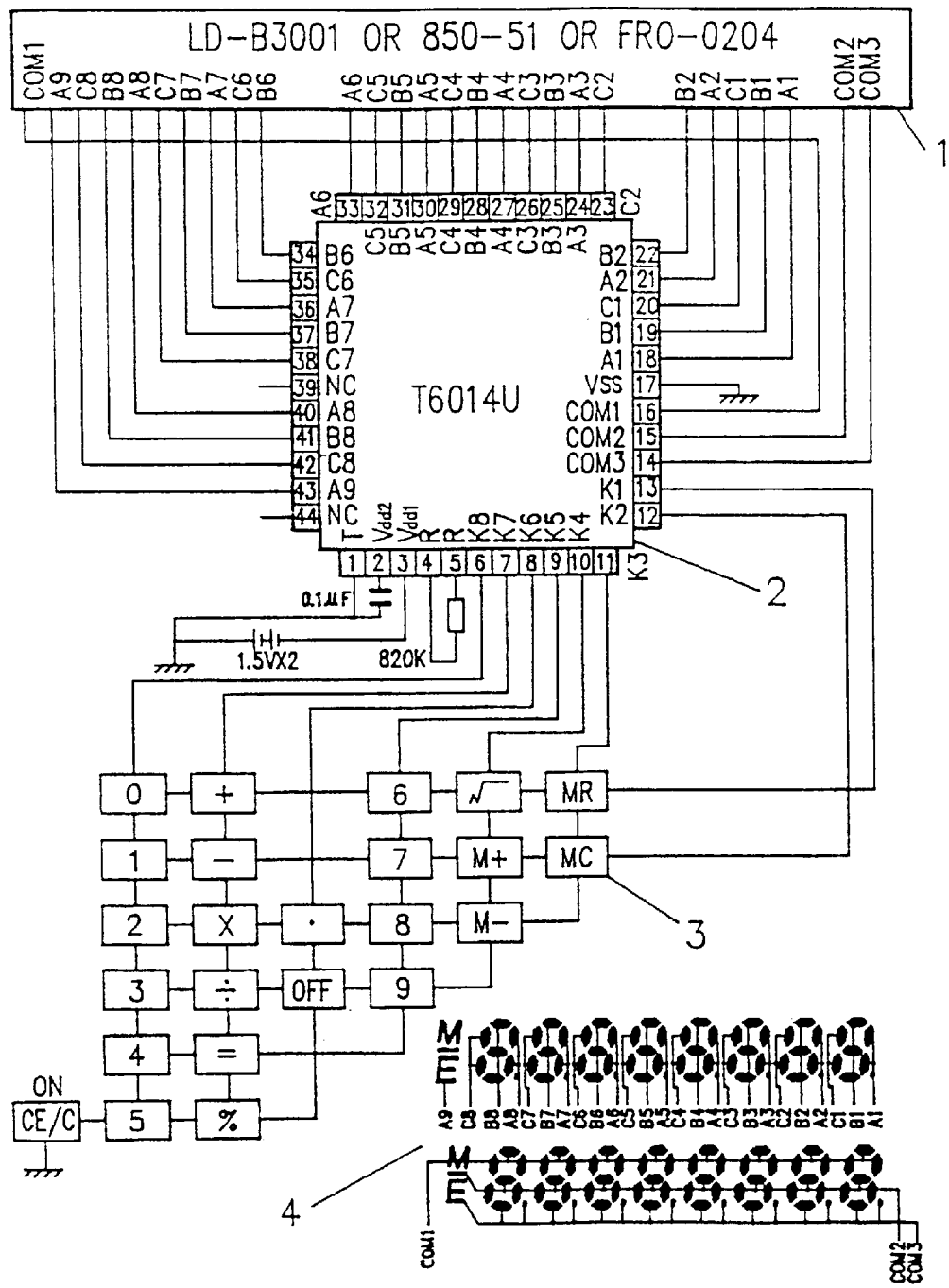
FIG. 4 is an example of the internal circuit structure employed by the electronic calculator of the present invention.
Figure 5:
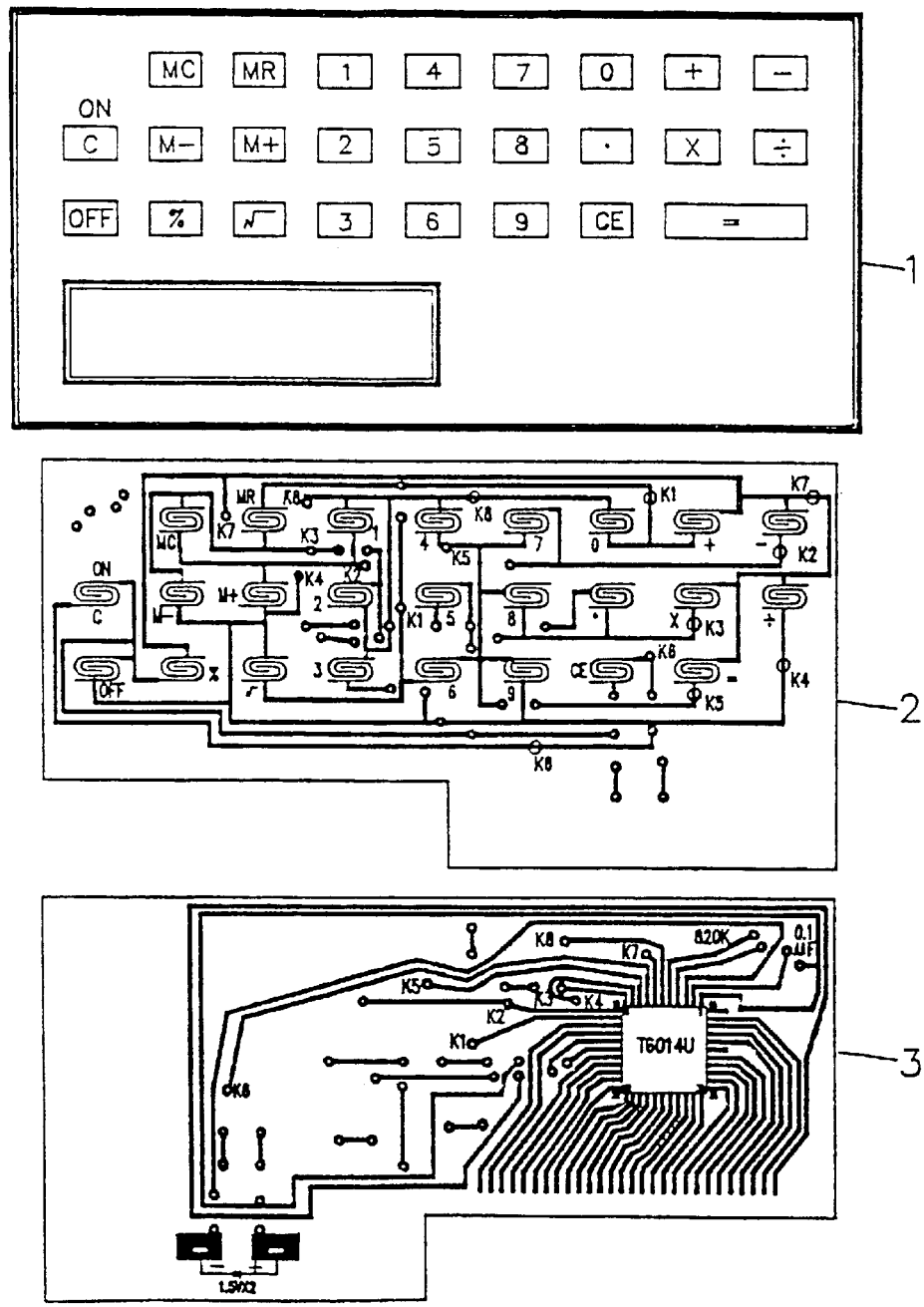
FIG. 5 is the structure of the electronic calculator of the present invention.

In summary, the present invention scientifically arranges the positions of the display screen and keys on the electronic calculator panel essentially in accordance with the characteristics of human vision to achieve the object of convenient use. Accordingly, the internal structure should be changed with the change of the potion of each of the components on the electronic calculator panel. Conventional electronic calculator essentially comprises a housing, keys, a display, a printed circuit board and chips. As compared with the conventional electronic calculators, the "new type of easy-to-use electronic calculator" comprised essentially the same components as mentioned above; but there are differences in the structures and arrangements of the housing, internal circuit board, display screen, and etc., which are different from the existing electronic calculators. In order to produce the "new type of easy-to-use electronic calculator", "it is necessary to redesign and manufacture the electronic calculator according to the structural features of the "new type of easy-to-use electronic calculator". First, each of the components of the housing and circuit board and etc. as required is manufactured, then those various components are assembled into an integrated "new type of easy-to-use electronic calculator". The following is an introduction to the main constituents and manufacturing process of the "new type of easy-to-use electronic calculator" designed according to scheme 1. FIG. 4 is an electrical schematic diagram of the "new type of easy-to-use electronic calculator", where (1) is a liquid crystal display screen, (2) a chip, (3) keys, (4) pins of liquid crystal display screen. In FIG. 5, (1) is a diagram of the electronic calculator panel made by injection of plastic, (2) a back view of the printed circuit and wiring, (3) a front view of the printed circuit and wiring. The manufacturing process is, after the manufacture of various components, then the devices such as the chip and etc. are welded onto the printed circuit board according to the circuitry shown in the electric schematic diagram, and finally the required "new type of easy-to-use electronic calculator" is assembled. It should be noted that the design and manufacture method and process of the "new type of easy-to-use electronic calculator" are similar to that of the existing electronic calculators, there is no technical or processing difficulty. This can be easily achieved by ordinary technicians in the art, and this "new type of easy-to-use electronic calculator" can easily be manufactured by the existing factories engaged in the producing of conventional electronic calculators, thus this product is easy to produce.

The basic principle and method of the present invention are also applicable on electronic computers, typewriter, telex machines and etc. insofar as they have a display screen and input keys. Satisfactory effects can be obtained if this method is used in those aspects.

Electronic computers have been widely used now. It is well known that electronic computer mainly comprises a processing unit, a display, a keyboard and etc., the principle and structure thereof are similar to that of the electronic calculator. In principle, an electronic calculator is a miniature electronic computer which collectively assembles the processing unit, display, keyboard of an electronic computer onto a single housing. Therefore, the electronic computer also has the problem of difficult to input like the electronic calculator the input keyboard of the electronic computer can be suitably modified according to the above mentioned basic principle and method, the object of easy-to-use can thus be achieved. There are many embodiment schemes, the simplest scheme is to provide a display with input display function in the space bar position of the electronic computer, without changing the display function of the original computer. There two displays are operable to correctly display the same input signal of the operation of the same key simultaneously, the input result can be known by watching the display of the keyboard display, thus greatly facilitating the operation and use by the user. Another scheme is to provide an electronic calculator with the display function of computer input in the position of the space bar of the electronic computer input keyboard, and a special function conversion key is utilized to convert between the computer functionality and the calculator functionality for the calculator. In the computer use state, it can be used to monitor the correctness or erroneousness of the input; while in the calculator use state, it can be used as a common calculator, the functionality conversion can be performed at any time, and it is very convenient to use. The method for realizing simultaneous display function of input of these two displays is to make the alphabetic keys A through Z, the ten numeric keys 0 through 9, and necessary symbolic keys mutually independent double-contact keys. When one of the keys is pressed, two separate pairs of contacts can be simultaneously closed, respectively, to effect these two display function of input simultaneously. The manufacturing is simple and easy to carry out.

Furthermore, after the employment of the new type of input keyboard, one may appropriately keep a distance fro m the original display when he is using the electronic computer, in order to reduce the harmful effect on human health from the elector magnetic radiation, it is especially important for those using the electronic computer in their work for long time. It can be said that this is a both convenient and safe electronic computer.

What is claimed is:

1. A new type of easy-to-use electronic calculator, comprising:

a display section with a display screen, a circuitry section, keys and a housing with a panel, wherein the positions of the display screen and input keys on the panel of said electronic calculator are arranged according to the following schemes on the basis of features of human vision;

a) positioning the ten frequently used numerical input keys 0 through 9 in rows and columns in a small scope, wherein the scope is located to the upper right or right side of a last digit of the display screen and a distance between said scope and the last digit corresponds to a distance between two of said keys and is smaller than the distance on said panel occupied by one of said keys;

b) associating the last digit or the last digit as enlarged of the display screen of the electronic calculator with the ten frequently used numeric input keys 0 through 9 in such a way that the last digit or the enlarged last digit is incorporated into said rows and columns in said scope, occupying a position corresponding to one or several of said keys.

2. A new type of easy-to-use input keyboard suitable for use in electronic computers, electronic typewriters and telex machines, comprising a panel and a keyboard input display and input keys provided on said panel, characterized in that on the basis of features of human vision, the keyboard input display having the function of displaying inputted symbols is additionally provided on the existing input keyboard, and the positions of said keyboard input display and said input keys are arranged according to the following schemes;

- a) positioning frequently used input keys on said panel of said easy-to-use input keyboard in rows and columns in a small scope, wherein the scope is located to the upper right or right side of a last digit of said keyboard input display and a distance between the scope and the last digit corresponds to a distance between two of said input keys and is smaller than the distance on said panel occupied by one of said input keys;

- b) associating the last digit or the last digit as enlarged of said keyboard input display with the frequently used input keys in such a way that the last digit or the enlarged last digit is incorporated into said rows and columns in said scope, occupying a position corresponding to one or several of said input keys.

\* \* \* \* \*